United States Patent [19]

Gehse

[11] Patent Number: 4,570,880
[45] Date of Patent: Feb. 18, 1986

[54] ARRANGEMENT OF DEVICES TO SEVER AND REMOVE CANOPY WALL SECTIONS FROM AIRCRAFT COCKPITS

[75] Inventor: Hartmut Gehse, Markdorf, Fed. Rep. of Germany

[73] Assignee: Dornier GmbH, Friedrichshafen, Fed. Rep. of Germany

[21] Appl. No.: 462,790

[22] Filed: Feb. 1, 1983

[30] Foreign Application Priority Data

Apr. 10, 1982 [DE] Fed. Rep. of Germany ....... 3213380

[51] Int. Cl.[4] .............................................. B64C 1/32
[52] U.S. Cl. .................................. 244/122 AF; 89/1.57
[58] Field of Search ..... 244/122 AF, 122 A, 122 AE, 244/122 R, 121; 89/1 B

[56] References Cited

U.S. PATENT DOCUMENTS

| | | | |
|---|---|---|---|
| 2,970,793 | 2/1961 | Beem et al. | 244/122 AF |
| 2,971,728 | 2/1961 | Martin | 244/122 AF |
| 3,670,998 | 6/1972 | Charleville et al. | 244/122 AF |
| 3,806,069 | 4/1974 | Galton | 244/122 AF |
| 4,275,858 | 6/1981 | Bolton et al. | 244/122 AF |
| 4,301,707 | 11/1981 | Schimmel et al. | 244/122 AF |

FOREIGN PATENT DOCUMENTS

| | | | |
|---|---|---|---|
| 156049 | 3/1953 | Australia | 244/121 |
| 2492336 | 4/1982 | France | 244/122 AF |

*Primary Examiner*—Trygve M. Blix
*Assistant Examiner*—Rodney Corl
*Attorney, Agent, or Firm*—Ralf H. Siegemund

[57] ABSTRACT

An arrangement of devices for removing wall parts of a cockpit canopy in emergencies, with fuses being mounted in such a manner to the canopy glass for the purpose of the rapid removal of glass parts from the ejection path of a person to be rescued. Glass halves are formed by severing specific glass sections while maintaining a bending line along a specific bending path in the area of the longitudinal glass edges.

3 Claims, 6 Drawing Figures

ARRANGEMENT OF DEVICES TO SEVER AND REMOVE CANOPY WALL SECTIONS FROM AIRCRAFT COCKPITS

This invention relates to arranging devices for severing and removing wall parts of the canopy of an aircraft cockpit to provide an emergency exit for the crew, especially the canopy glass of aircraft, the devices containing fuses in connection with ignition devices along predetermined separation lines at the wall parts.

In case of rescue, for instance of aircraft crews, the glass of the canopy blocks the way out.

A number of methods or devices to clear the way are known. It is known for instance to jettison the entire canopy in case of emergency. It is further known to initiate or even consummate the rupture of the canopy glass with pyrotechnical means along a predetermined rupture line, with or without the assistance of a canopy breaker, for instance using ejector seat systems.

It also is known to outwardly catapult the crew members to be rescued through the canopy glass without prior break-up, for instance using pyrotechnical means.

A relatively substantial time is required to jettison the entire canopy, whereby this solution is precluded in high speed flights. The available time interval for rescue, shortened because of the time from the initial occurrence of the danger, the release of the hood stop, and subsequent separation of the canopy, permit only conditional implementation.

Substantial danger of injury exists in the method whereby the crew to be rescued is ejected through the canopy glass and furthermore to the apparel of the crew. It is impossible to prevent that the survival gear carried by these persons to be rescued, for instance lifesaver jackets, cold-insulating suits and oxygen masks escape damage. As a consequence, the chances of rescue are substantially reduced even in the case of successful evacuation.

In order to reduce the cited dangers in case of emergencies, use is made of pyrotechnical means such as fuses together with ignition devices. The fuses are mounted at the canopy glass along predetermined rupture lines.

In one known arrangement, the fuses extend near the edge of the glass as a closed loop and, furthermore, starting from the rear glass edge they form certain patterns in an area of the vertical plane of symmetry of the canopy glass, with salients transverse thereto.

The fuses arranged in the area of the vertical plane of symmetry extend over a restricted length in the longitudinal direction of the canopy only, that is, they are without connection with the fuses in the area of the forward glass edge.

When separating the canopy glass it is not assured that the crew to be rescued and/or their survival gear will escape collision with blown off or broken off parts of the glass.

It is the object of the present invention to provide and arrange means for severing the canopy glass that the glass, or parts thereof, following the separation action, are reliably removed from the path of ejection as fast as possible, that is, in the shortest way, while retaining the structural strength of the severed glass, in order to prevent collisions between the persons to be rescued, or their gear, with glass parts or shards.

This problem is solved by the invention in that:

(a) one or more fuse segments extend over the entire or approximately the entire length of the canopy glass in the area of and along the longitudinal plane of symmetry, and further (b) other fuse segments extend over the entire or approximately the entire length of the forward and rear glass edges, whereby (c) the longitudinal edges of the canopy glass form bending and pivot supports for the glass halves at their clamping sites until the rupture at the clamping sites takes place, at a delay with respect to ignition of the fuses.

By means of the arrangement and devices of the invention, minimal paths are achieved for the glass or glass parts, with relatively long times of acceleration to remove the canopy glass or parts thereof from the ejection path of the persons to be rescued.

Moreover, the delayed separation of specific glass sections predetermines specific lines of bending (pivot lines) in the area of the longitudinal glass edges and in the longitudinal glass clampings, about which the glass halves formed prior to severing on both sides of the longitudinal plane of symmetry by the fuse segments can be moved to the outside. This outward motion of the glass halves, that is, this motion laterally away from the person to be rescued, is enhanced by the substantially negative air forces acting on the glass halves. The motion of the glazing halves out of the ejection path of the person being rescued is furthermore enhanced by the canopy breaker of an ejection seat or by the shoulders of the person to be rescued. The structural strength of the glass halves is substantially retained after igniting the fuse segments.

The outward acceleration, that is away from each other, of the two glass halves takes place across a relatively large sideways path and through a relatively large time interval, whereby splintering of the glass halves in the area of the clamping forming the pivot support of the glass halves takes place with a delay, the glass halves thereby clearing the ejection path as fast as possible. Once the halves of the glass reach a flip open position averting injury and damage to the person to be rescued and the gear worn, the glass halves are ruptured in the area of the longitudinal glass edges, i.e., of the clamping to the aircraft structure.

A further embodiment of the invention provides that the fuse segments in the area of the rear glass edge and starting from the plane of symmetry extend in restricted manner in the direction of the longitudinal glass edges. As a result, the motion imparted to the glass halves not only points away from the longitudinal plane of symmetry and around the clamping pivot support, but also includes a constrained upward direction. A defined guidance is thereby imparted to the two glass halves away from the ejection path of the pilot, supported by the incident flow on the two glass halves. That section of the glass in the area of the glass rear edge not cut open by the fuses equally represents a rotational support for the glass halves until the incident wind forces cause automatic rupture.

Another advantageous embodiment of the invention provides that fuse segments in the area of the longitudinal glass sections are mounted on both sides of the plane of symmetry and that these fuse segments are connected through ignition delay means to the ignition system common to all fuses. In this manner, rapid clearance of the ejection path for the crew member to be rescued is also achieved for an aircraft on the ground by the glass in the area of the longitudinal plane of symmetry and near the forward and rear glass edges being separated together but delayed with respect to the area of the longitudinal edge. As a result, the area of the longitudinal clamping along the longitudinal glass edges again acts as a rotational support, whereby the glass halves retaining their structural strength are forced outwardly away from the longitudinal plane of symmetry by means of the canopy breaker of an ejection seat system or by the shoulders of the person to be rescued.

A further feature arranges the fuse segments in the area of the longitudinal glass edges on both sides of the plane of symmetry and makes possible a specific ignition sequence of the individual fuse segments with corresponding delays.

The invention will be further illustrated by reference to the accompanying drawings, in which.

Figure 1:
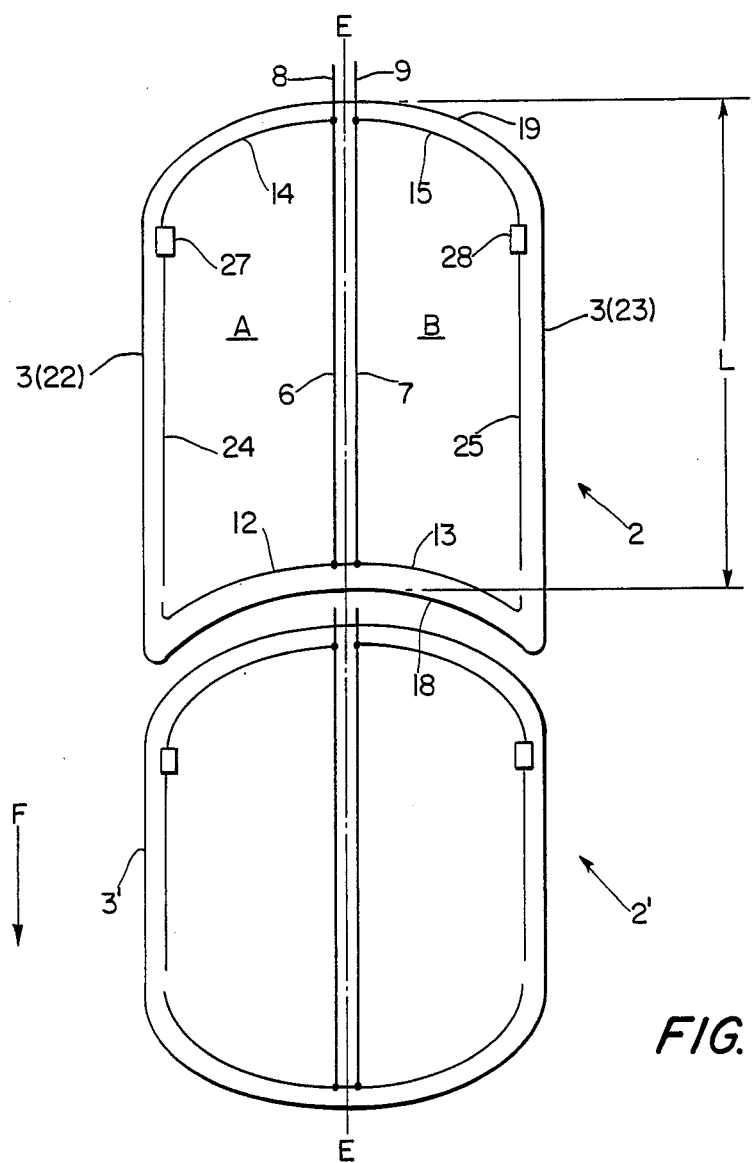
FIG. 1 is a schematic top view of the canopy of an aircraft.
Figure 2:
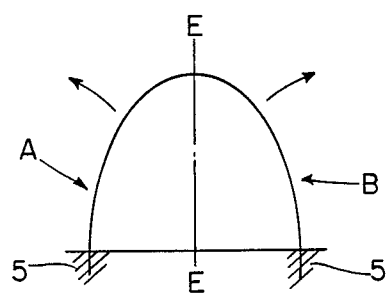
FIG. 2 is a schematic cross-section of the canopy.

The illustrative embodiment shown in FIGS. 1 through 6 includes a canopy glass composed of a forward and rear part 2 and 2', respectively, together with the associated frame parts.

The frame seating the canopy glass, i.e., the glass clamping means at the airframe 5, are denoted by 3 and 3' respectively. The same reference numerals are applicable here for the two parts 2 and 2' of the canopy glass. The longitudinal plane of symmetry E—E is indicated in dash-dot lines in the longitudinal direction of the canopy.

Fuse segments 6 and 7 are mounted in known manner to the glass on both sides and at the same distance in the area of the longitudinal plane of symmetry E—E. The segments 6 and 7 extend over the entire length L of the canopy glass 2 and 2' respectively, each being connected to ignition cables 8 and 9 in turn connected to a pyrotechnical ignition system, omitted herefrom for simplification.

Furthermore, the fuse segments 6 and 7 are connected at their forward and rear ends to fuse segments 12 and 13 or 14 and 15, respectively, mounted to the glass in the area of the forward and gear glass edges 18 and 19 respectively.

FIG. 1 also shows another illustrative embodiment. In the case of severing, i.e., separation of the canopy glass in an emergency for an aircraft on the ground, a further fuse segment 24 and 25 is mounted in the vicinity of the longitudinal edges 22 and 23, respectively, of the canopy glass. These segments 24 and 25 each by means of an ignition delay member 27 and 28, respectively, of a known design are connected to the fuse segments 14 and 15 in the area of the rear glass edge 19 or to the segments 12 and 13 or directly to the ignition 8 and 9.

Figure 3:
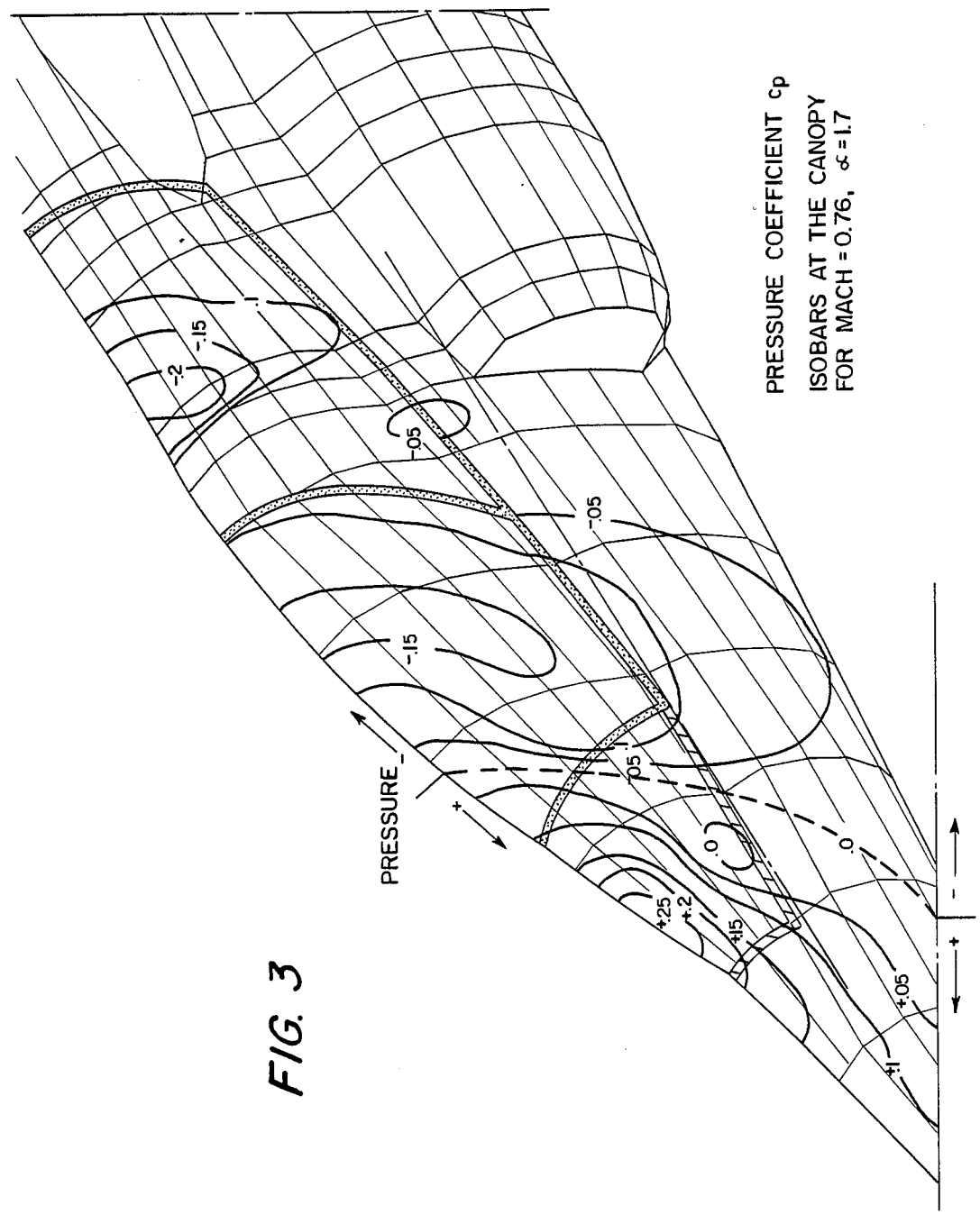
FIG. 3 is a perspective view of the pressure relations at the outside of the canopy glass.

FIG. 3 shows the pressure relations, that is, the pressure domains forming at the glass outside of the canopy by means of the indicated isobars, while the aircraft is in aerodynamic flow. The isobars illustratively correspond to pressure relations occurring at sustained flight speeds of about Mach 0.76 and for a pitch angle alpha = 1.7°. As found from measurement, predominantly negative pressure relations form at the exterior of the canopy, so that a suction effect is exerted on the canopy glass, this suction being used to outwardly withdraw the canopy glass following the separation thereof into two halves in an emergency so as to remove the glass parts from the path of ejection of the person to be rescued, as will be explained further below in greater detail.

Figure 6:
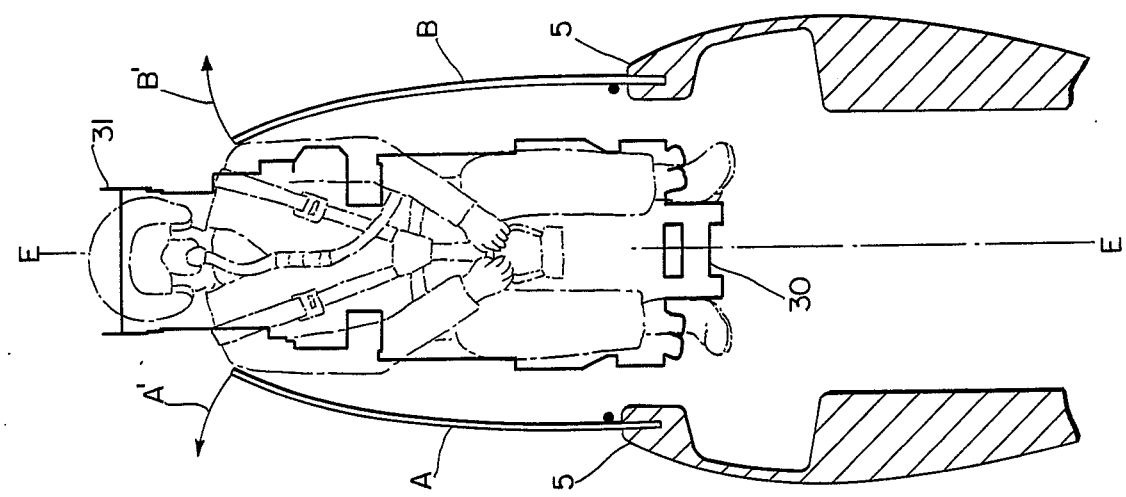
FIGS. 4 through 6 show partial cross-sections of an aircraft canopy for the essential stages of ejection of a crew member to be rescued, together with an ejection seat system.
Figure 5:
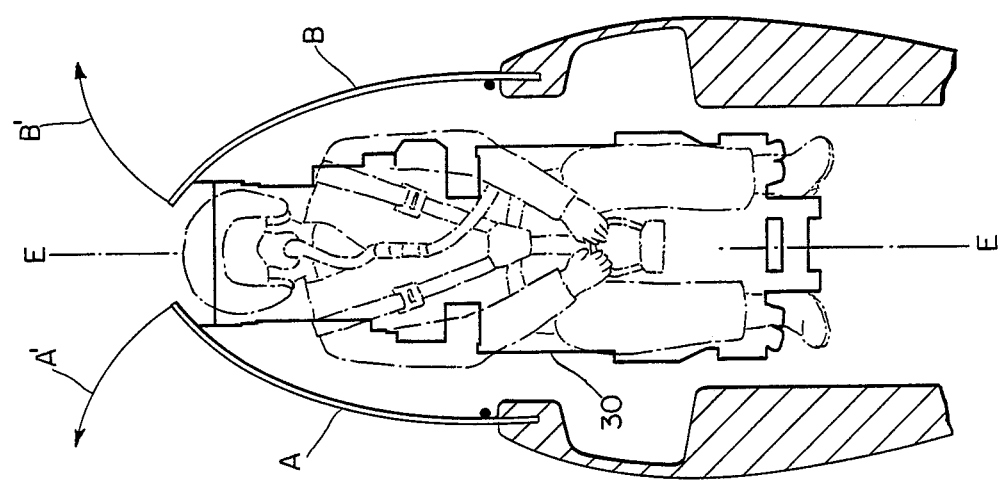
Figure 4:
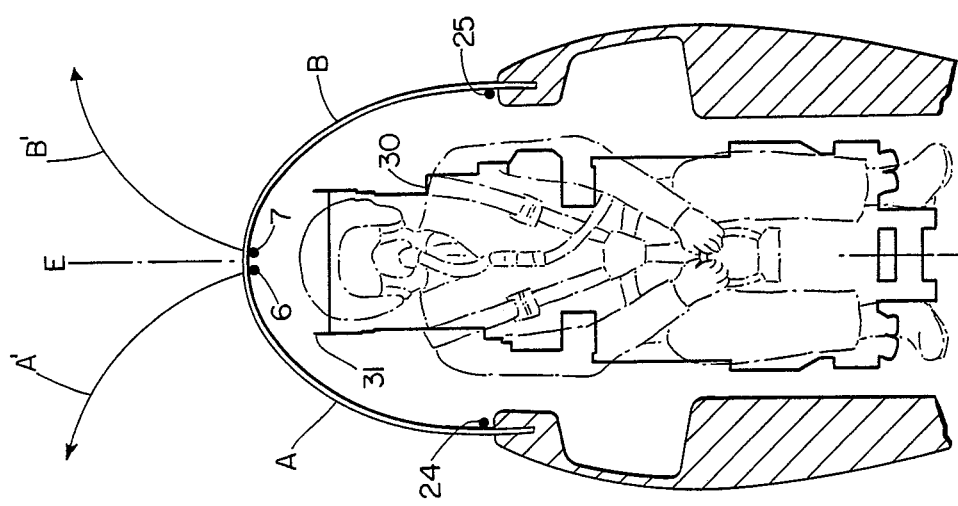

FIGS. 4 through 6 show three essential stages of the emergency evacuation of a crew member in conjunction with an ejection seat system 30 and with the arrangement or devices of the invention.

The stage shown in FIG. 4 shows the canopy glass when the fuses 6, 7; 12, 13; 14, 15 are not yet ignited, that is, when the glass as yet has not been severed. The fuses are indicated in schematic form as dots. The glass halves on both sides of the longitudinal plane of symmetry E—E are denoted by A and B, and the displacement arrows A' and B', respecitively, indicate the flip-open motion of the glass which was severed by the fuses 6 and 7, respectively, in the area of the longitudinal plane of symmetry E—E.

The operation of the described arrangement or design is as follows:

In an emergency requiring the evacuation of the crew from the aircraft cockpit while in flight or at high taxiing speeds on the ground, the fuse segments 6 and 7 in the area of the longitudinal plane of symmetry E—E are ignited prior to the actuation of the ejection seat system 30 and simultaneously there takes place the ignition of the fuse segments 12 and 13, and 14 and 15, respectively, at the forward and rear edges 18 and 19 of the glass.

Thereby the canopy glass is severed over the entire length L in the area of the longitudinal plane of symmetry E—E and in the vicinity of the forward and rear edges 18 and 19, respectively, and in such a manner that two glass halves A and B are produced. The structural strength of the two glass halves A and B is preserved in the process.

Initially, the glass halves A and B remain clamped in the area of the longitudinal glass edges 22 and 23, respectively, and are not separated by the fuses. The clamping area for the halves A and B in the canopy frame 3 acts as a pivot support for the motion of the glass halves A and B in the outward direction indicated by the arrows A' and B', respectively.

The motions of the glass halves A and B is generated in the presence of adequate aerodynamic flow around the canopy glass because of the domains of reduced pressure, as shown in FIG. 3.

Thereby the glass halves A and B are pivoted in the shortest possible way about the longitudinal glass edges 22 and 23, respectively, and out of the way of the ejection path of the ejection seat, i.e., of the crew member to be rescued. After a correspondingly large distance in the elastic range has been covered by the two glass halves with pivot supports in the area of the longitudinal glass edges 22 and 23, rupture of the glass halves A and B follows automatically near the longitudinal edges 22 and 23. At that moment, the ejection seat 30 together with its canopy breaker 31 assumes approximately the position shown in FIG. 5 and supports the motions of the glass halves A and B in the direction of the arrows A' and B'. The glass halves A and B are moved by the front incident flow out of the ejection path of the person to be rescued, and thereby injury to the person and damage to his gear are reliably prevented.

In an energency concerning an aircraft on the ground where the flow around the canopy glass is non-existant or inadequate, the fuse segments 24 and 25 are ignited with a delay by the means 27 and 28, respectively, compared to the segments 6 and 7; 12 and 13; and 14 and 15.

Ignition of the fuse segments 24 and 25 takes place only after the glass halves A and B respectively have covered a corresponding path in the direction of the arrows A' and B' about the glass clamping, acting as a pivot support, in the area of the longitudinal glass edges 22 and 23.

As in this instance no suction is formed on the glass exterior to reinforce the motion of the glass halves after severing by means of the fuse segments 6, 7; 12, 13; and 14, 15, the two halves A and B are forced open sideways by the canopy breaker 31 and the shoulders of the person being rescued, and are forced outwardly by the interior cabin pressure in the direction of the arrows A' and B', respectively, out of the way of the ejection path of the crew member to be rescued. The ignition of the fuse segments 24 and 25 will be delayed and will take place when the glass halves A and B have moved out of the ejection path. A delay time of 0.3 second is adequate for this purpose.

It will be obvious to those skilled in the art that many modifications may be made within the scope of the present invention without departing from the spirit thereof, and the invention includes all such modifications.

What I claim is:

1. In an arrangement of devices for severing and removing of a canopy of a cockpit to evacuate crew members in emergencies, especially the canopy glass of aircraft, the improvement comprising at least one fuse segments extending over at least nearly the entire length (L) of the canopy glass in the area of and along the longitudinal plane of symmetry (E—E) thereof substantially from a forward edge to a rear edge of the canopy, for severing the canopy along a central apex portion;
 additional fuse segments extending over the entire or nearly entire length of the forward and rear glass edges:
 means for concurrently igniting said afore mentioned fuse segments; and
 longitudinal cockpit glass edges establish bending pivot supports for glass halves in the areas of clamping, the glass halves being defined by rupture lines along said fuse segments;
 means for maintaining connection of the longitudinal glass edges until rupture takes place in the clamping area with a delay with respect to the ignition of the said fuse segments;
 means mounting further fuse segments along the longitudinal glass edges on both sides of the plane of symmetry: and
 ignition delay devices connecting these further fuse segments to an ignition system common to all fuses.

2. An arrangement according to claim 1 including at least one fuse segment (6 and 7) each mounted in the longitudinal direction on both sides and in the vicinity of the plane of symmetry (E—E).

3. An arrangement according to claim 1 in which particular ones of the additional fuse segments in the area of the rear glass edge have a limited longitudinal size starting from the plane of symmetry (E—E) in the direction of the longitudinal glass edges (3; 22, 23).

* * * * *